(12) United States Patent
Dice

(10) Patent No.: US 11,887,448 B2
(45) Date of Patent: Jan. 30, 2024

(54) DIGITAL VIDEO ALARM GUARD TOUR MONITORING COMPUTER SYSTEM

(71) Applicant: Dice Corporation, Bay City, MI (US)

(72) Inventor: Clifford Dice, Midland, MI (US)

(73) Assignee: Dice Corporation, Bay City, MI (US)

( * ) Notice: Subject to any disclaimer, the term of this patent is extended or adjusted under 35 U.S.C. 154(b) by 0 days.

(21) Appl. No.: 17/675,673

(22) Filed: Feb. 18, 2022

(65) Prior Publication Data

US 2022/0262217 A1  Aug. 18, 2022

Related U.S. Application Data

(60) Provisional application No. 63/150,808, filed on Feb. 18, 2021.

(51) Int. Cl.
| | | |
|---|---|---|
| *G08B 13/196* | (2006.01) | |
| *G06V 20/40* | (2022.01) | |
| *G06V 20/52* | (2022.01) | |

(52) U.S. Cl.
CPC ....... *G08B 13/19602* (2013.01); *G06V 20/41* (2022.01); *G06V 20/44* (2022.01); *G06V 20/52* (2022.01)

(58) Field of Classification Search
CPC ........ G08B 13/19602; G08B 13/19645; G08B 13/1968; G08B 13/19682; G06V 20/41; G06V 20/44; G06V 20/52
USPC .......................................... 386/226; 348/155
See application file for complete search history.

(56) References Cited

U.S. PATENT DOCUMENTS

| | | |
|---|---|---|
| 6,400,265 B1 | 6/2002 | Saylor et al. |
| 6,445,774 B1 | 9/2002 | Kidder et al. |
| 6,829,371 B1 | 12/2004 | Nichani et al. |
| 6,977,585 B2 | 12/2005 | Falk et al. |
| 7,984,179 B1 | 7/2011 | Huang |
| 8,780,199 B2 | 7/2014 | Mimar |
| 9,740,941 B2 | 8/2017 | Bae et al. |
| 10,007,261 B2 | 6/2018 | Van Camp |
| 10,319,202 B2 | 6/2019 | Yau et al. |
| 10,347,103 B2 | 7/2019 | Hicks, III |
| 10,389,971 B2 | 8/2019 | Arora |

(Continued)

FOREIGN PATENT DOCUMENTS

| | | |
|---|---|---|
| CN | 103747211 A | 4/2014 |
| CN | 107205160 A | 9/2017 |

(Continued)

*Primary Examiner* — Helen Shibru
(74) *Attorney, Agent, or Firm* — Brooks Kushman P.C.

(57) ABSTRACT

A computer system for digital video alarm guard tour monitoring. The computer system includes a computer having non-transitory memory for storing machine instructions that are to be executed by the computer. The machine instructions when executed by the computer implement the following functions: receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

20 Claims, 5 Drawing Sheets

(56) References Cited

U.S. PATENT DOCUMENTS

| | | |
|---|---|---|
| 10,732,962 B1 | 8/2020 | Florescu |
| 11,158,177 B1 | 10/2021 | Elhattab et al. |
| 2002/0054211 A1* | 5/2002 | Edelson ................. H04N 7/183 348/169 |
| 2003/0025599 A1* | 2/2003 | Monroe ........... G08B 13/19691 709/200 |
| 2005/0128295 A1 | 6/2005 | Addy |
| 2005/0146606 A1 | 7/2005 | Karsenty et al. |
| 2006/0170769 A1 | 8/2006 | Zhou |
| 2007/0219843 A1 | 9/2007 | Keeler et al. |
| 2008/0024610 A1 | 1/2008 | Konishi |
| 2010/0123908 A1 | 5/2010 | Denoue et al. |
| 2011/0169631 A1 | 7/2011 | Sheu et al. |
| 2013/0091432 A1 | 4/2013 | Shet et al. |
| 2014/0043480 A1 | 2/2014 | Wu |
| 2015/0067460 A1 | 3/2015 | Beaumont |
| 2015/0116499 A1 | 4/2015 | Worrill et al. |
| 2016/0071403 A1 | 3/2016 | Vaidhyanatan et al. |
| 2016/0182834 A1 | 6/2016 | Sivasankaran |
| 2018/0151041 A1 | 5/2018 | Hicks, III |
| 2019/0174089 A1 | 6/2019 | Chen et al. |
| 2019/0271774 A1 | 9/2019 | Zhang et al. |
| 2019/0289263 A1 | 9/2019 | Amini et al. |
| 2019/0295392 A1 | 9/2019 | Johan et al. |
| 2020/0374333 A1 | 11/2020 | Racz et al. |
| 2021/0314530 A1 | 10/2021 | Carey |
| 2021/0368137 A1 | 11/2021 | Alcantara et al. |
| 2021/0409656 A1 | 12/2021 | Imes |
| 2022/0172586 A1 | 6/2022 | San Pedro |
| 2022/0335813 A1* | 10/2022 | Dice ..................... H04N 21/482 |
| 2022/0335815 A1* | 10/2022 | Dice ..................... G08B 27/005 |

FOREIGN PATENT DOCUMENTS

| | | |
|---|---|---|
| CN | 109922303 A | 6/2019 |
| CN | 107959885 B | 5/2020 |
| GB | 2532848 B | 6/2019 |
| KR | 20040067379 A | 7/2004 |

\* cited by examiner

DIGITAL VIDEO ALARM GUARD TOUR MONITORING COMPUTER SYSTEM

CROSS-REFERENCE TO RELATED APPLICATIONS

This application claims the benefit of U.S. provisional application Ser. No. 63/150,808 filed Feb. 18, 2021, the disclosure of which is hereby incorporated in its entirety by reference.

TECHNICAL FIELD

This invention relates to a digital video alarm guard tour monitoring computer system.

BACKGROUND

Alarm monitoring computer systems have been developed and implemented. These computer systems are configured to receive digital and/or analog signals that potentially relate to an alarm event. The received signals may be received from sensors and/or detectors, including without limitation, motion detectors (e.g., passive infrared motion detectors), smoke detectors, sound detectors, breakage detectors (e.g., glass break detectors), temperature detectors, ultrasonic detectors, microwave detectors, magnetic switches, and photoelectric beams. The received signals are processed by alarm monitoring computer systems to determine whether an alarm event has occurred. If an alarm event has occurred, the alarm monitoring computer system is configured to determine a course of action based on the occurrence of the alarm event and an alarm event type associated with the alarm event. Non-limiting examples of alarm event types include fire alarms, burglary alarms, and intrusion alarms. Alarm monitoring computer systems have limited capabilities regarding the use of digital video.

SUMMARY

In one embodiment, a computer system for digital video alarm guard tour monitoring is disclosed. The computer system includes a computer having non-transitory memory for storing machine instructions that are to be executed by the computer. The machine instructions when executed by the computer implement the following functions: receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

In another embodiment, a computer readable medium having non-transitory memory for storing machine instructions that are to be executed by the computer is disclosed. The machine instructions when executed by the computer implements the following functions: receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

In yet another embodiment, a method for digital video alarm guard tour monitoring is disclosed. The method includes receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

BRIEF DESCRIPTION OF THE DRAWINGS

FIG. 5 is a GUI of a dashboard of a digital video alarm guard tour according to one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Alarm monitoring computer systems have been developed and implemented. These computer systems are configured to receive digital and/or analog signals that potentially relate to an alarm event. The received signals may be received from sensors and/or detectors, including without limitation, motion detectors (e.g. passive infrared motion detectors), smoke detectors, sound detectors, breakage detectors (e.g. glass break detectors), temperature detectors, ultrasonic detectors, microwave detectors, magnetic switches, and photoelectric beams. The received signals are processed by the alarm monitoring computer systems to determine whether an alarm event has occurred. If an alarm event has occurred, the alarm monitoring computer system is configured to determine a course of action based on the occurrence of the alarm event and an alarm event type associated with the alarm event. Non-limiting examples of alarm events include fire alarms, burglary alarms, and intrusion alarms. Alarm monitoring computer systems have limited capabilities regarding the use of digital video.

One or more embodiments are drawn to a digital video alarm guard tour monitoring computer system that includes a computer having non-transitory memory for storing machine instructions that are to be executed by the computer. The machine instructions when executed by the computer implement the following functions: receive one or more guard tour parameters; identify a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

Figure 1:
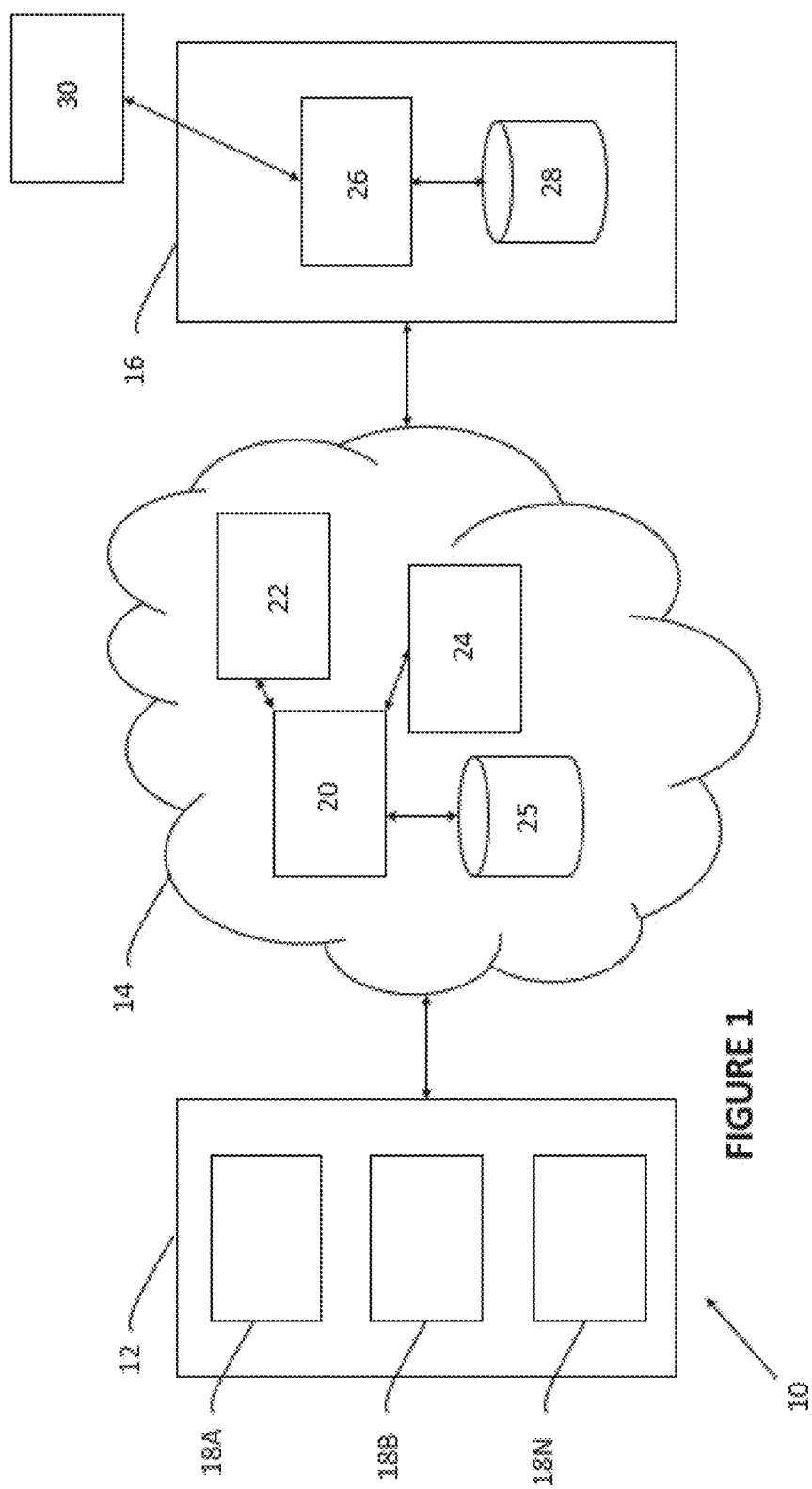
FIG. 1 depicts a computer architecture for a digital video alarm guard tour monitoring computer system according to one embodiment.

FIG. 1 depicts a computer architecture for digital video alarm guard tour monitoring computer system 10. Computer system 10 includes client network 12, digital video analytics server 14 and alarm monitoring server 16. Client network 12 includes network cameras 18A to 18N. Client network 12 is configured to transmit digital video clips and/or digital video frames to digital video analytics server 14. A digital video clip may be comprised of a series of sequentially recorded digital video frames. A digital video frame may be a single digital image. Client network 12 may include a digital video recorder (DVR) or network video recorder (NVR) configured to receive digital video clips and/or digital video frames from one or more of network cameras 18A to 18N and to transmit the digital video clips and/or digital video frames to digital video analytics server 14.

Digital video analytics server 14 may include gatekeeper server 20. Gatekeeper server 20 may be configured to selectively receive digital video clips and/or digital video frames from client network 12. Digital video analytics server 14 may further include motion detection module 22 and object detection module 24. Gatekeeper server 20 may be configured to selectively transmit digital video clips to motion detection module 22. Motion detection module 22 may be configured to perform motion detection using an artificial intelligence algorithm. Gatekeeper server 20 may be configured to selectively transmit digital video frames to object detection module 24. Object detection module 24 may be configured to perform object detection using an artificial intelligence algorithm. Gatekeeper server 20 may also be configured to selectively transmit digital video clips and/or digital video frames to database 25 for storage of the digital video clips and/or digital video frames. Digital video analytics server 14 may also be configured to transmit digital video clips and/or digital video frames to alarm monitoring server 16. Analytics data associated with the digital video clips and/or digital video frames may be transmitted to alarm monitoring server 16. The analytics data may be generated by motion detection module 22 and/or object detection module 24.

Alarm monitoring server 16 includes alarm monitoring module 26 and alarm monitoring database 28. Alarm monitoring module 26 may be configured to display graphical user interfaces (GUIs) on user device 30. User device 30 may be used by a user of digital video alarm monitoring computer system 10. The user may be a subscriber of alarm services associated with digital video alarm guard tour monitoring computer system 10. The user may be an operator at a central station or a client site. Alarm monitoring module 26 may be configured to receive digital video clips and/or digital video frames from digital video analytics server 14. Alarm monitoring database 28 may be configured to selectively store digital video clips and/or digital video frames received from digital video analytics server 14. Alarm monitoring module 26 may be configured to transmit data regarding a digital video guard tour to digital video analytics server 14.

Figure 2:
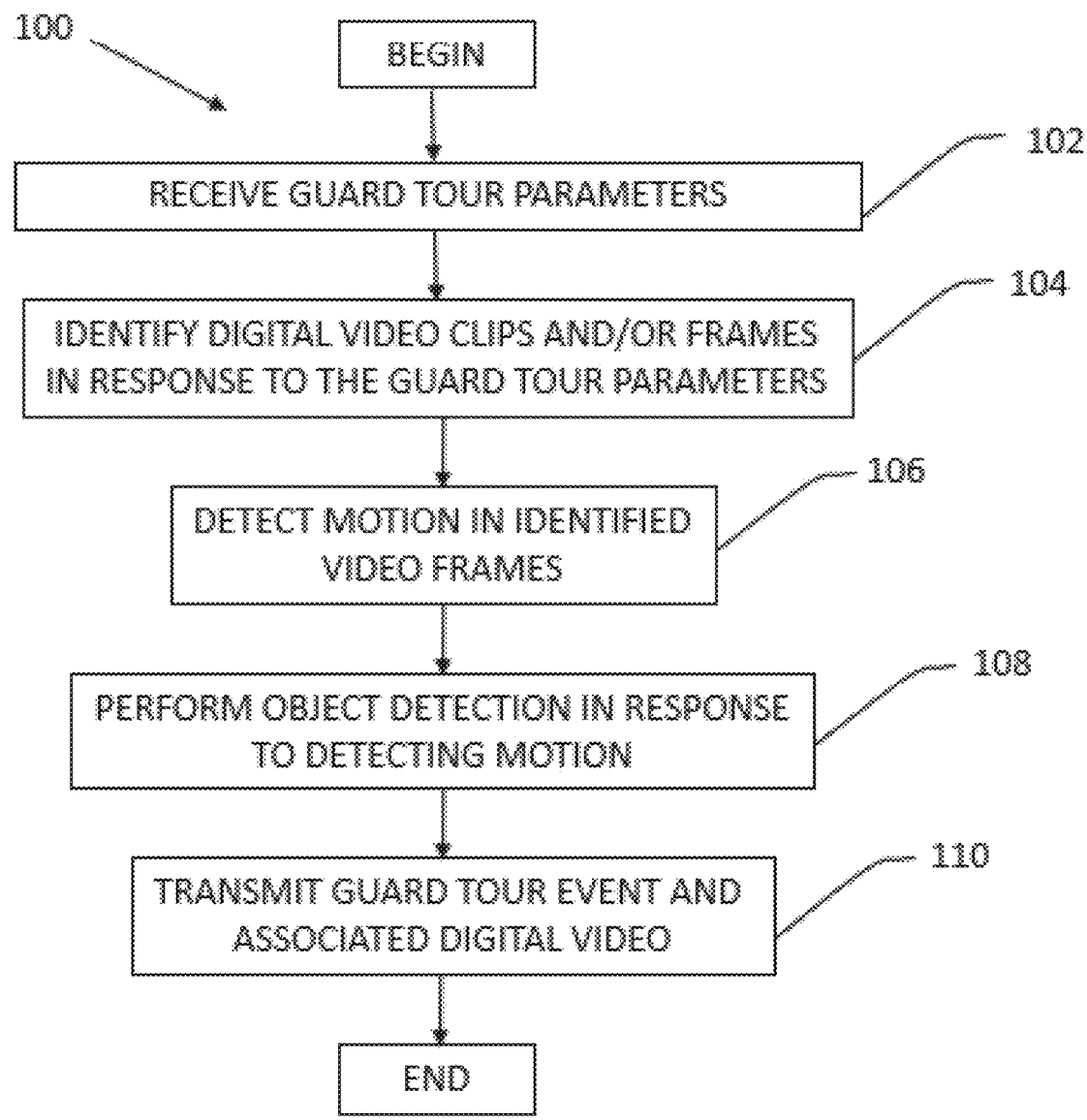
FIG. 2 depicts a flowchart of steps performed by a digital video alarm tour monitoring computer system according to one embodiment.

FIG. 2 depicts flowchart 100 of steps performed by digital video alarm tour monitoring computer system 100 according to one embodiment. Although FIG. 2 depicts a certain sequence of a series of steps, one or more steps may be rearranged and sequenced in a different order depending on the implementation of an embodiment. The steps may also be omitted, modified and added to depending on the implementation of the embodiment.

Flowchart 100 includes step 102. As described in step 102, guard tour parameters are received. One or more guard tour parameters may be transmitted by alarm monitoring module 26 to gatekeeper server 20 of digital video analytics server 14. Alarm monitoring module 26 may be configured to format a graphical user interface for display where the graphical user interface prompts a user for one or more guard tour parameters.

Figure 3:
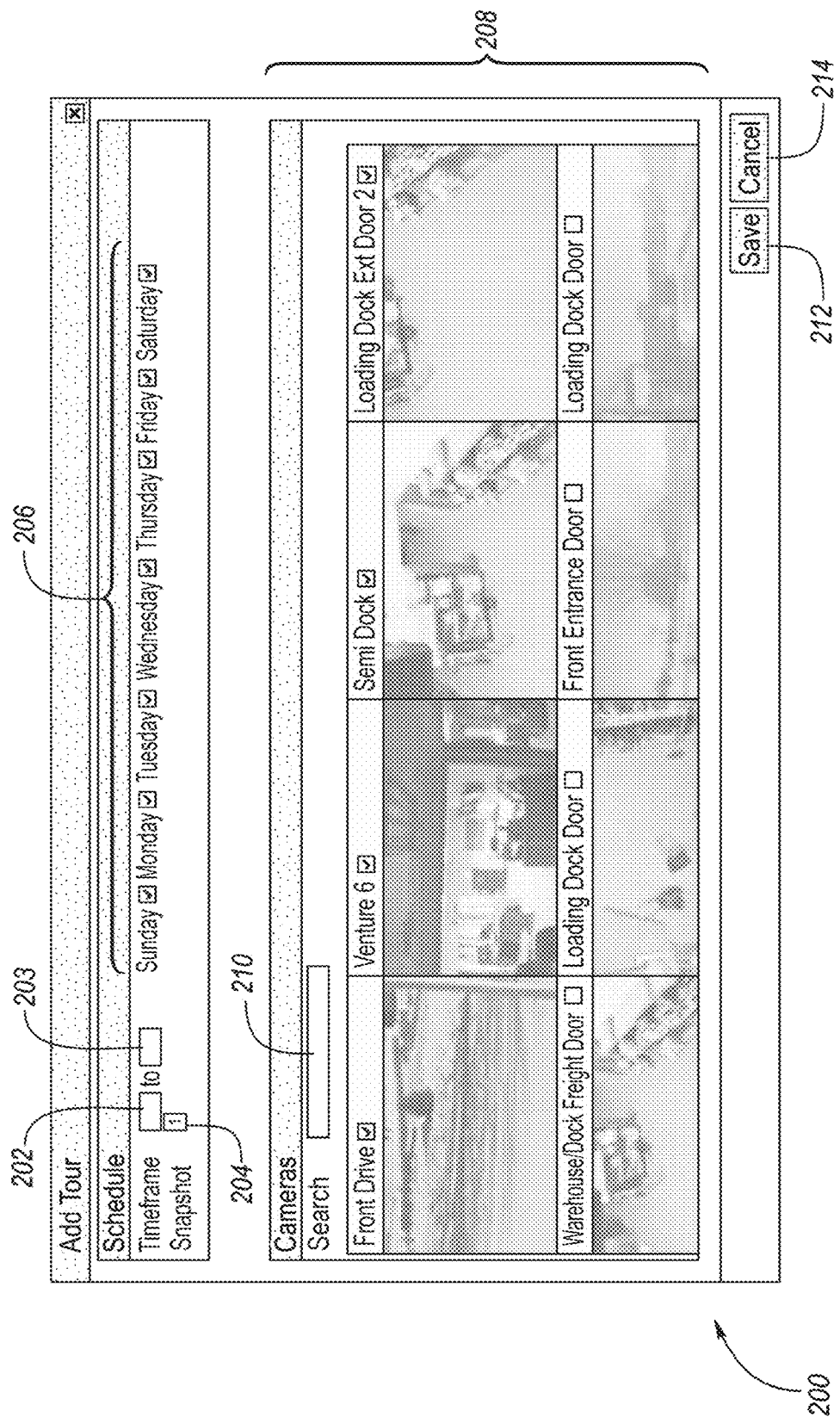
FIG. 3 is a graphical user interface ("GUI") for adding a digital video alarm guard tour according to one embodiment.

FIG. 3 is GUI 200 for adding a digital video alarm guard tour, including obtaining guard tour parameters, according to one embodiment. GUI 200 includes start timeframe input field 202, end timeframe input field 203 and snapshot input field 204. Start and end timeframe input fields 202 and 203 may be configured to receive a start time and end time, respectively, of the digital video alarm guard tour. The start and end times can be input in a military time. As an example, the start time is set to 800 (i.e. 8:00 am) and the end time is set to 815 (i.e. 8:15 am). Snapshot field 204 may be configured to receive an input of the number of digital video frames captured by computer system 10 over the course of a selected time slice. As shown in FIG. 3, snapshot input field 204 is set to a snapshot value of 1. In one embodiment, the snapshot value defines the number of times that the computer system 10 captures a digital video frame over a time slice. For instance, the time slice may be 5 seconds. Using this data (i.e. a snapshot of 1 and a selected time slice of 5 seconds) as an example, computer system 10 may be configured to capture 1 digital video frame over the course of 5 seconds during the digital video alarm tour. The snapshot number may be greater than 1 (e.g. 2, 3, 4, 5, 6, 7, 8, 9 or 10) depending on the implementation. The selected time slice may be greater than or less than 5 seconds (e.g. 0.1, 1, 2, 3, 4, 6, 7, 8, 9 or 10 seconds) depending on the implementation. GUI 200 also includes day of week click boxes 206 to toggle on or off each day of the week. When a day of week is toggled on, the virtual guard tour is executed on that day of the week. As shown in FIG. 3, all days of the week are toggled on.

In one or more embodiments, the gatekeeper server 20 connects to each network camera in the virtual guard tour and obtains a snapshot of the video a configurable number of times with a configurable delay between. According to a first example, where the snapshot value is 1, the gatekeeper server 20 connects to the client site and takes a snapshot, waits 5 seconds, and then take a final snapshot. In a second example, where the snapshot value is 3, the gatekeeper server 20 connects to the client site and take a snapshot, wait 5 seconds then take 1 snapshot, then wait 5 more seconds and take another, and finally wait 5 more seconds and take a fourth. In another example, the gatekeeper server 20 takes a snapshot, waits 5 minutes, then takes another and repeat this for an hour. This configuration is to allow the user to request about 10 frames in a minute for a smoother short duration video or 10 frames in an hour for more of a time lapse view of the site. In the 10 frames in an hour scenario, time passes more quickly so the operator could review an hour of the view in a shorter amount of time. As a benefit, the shorter video may be used to determine status of a view, such as a view of a cash register. The longer time lapse still video can be used at a construction site or watching a gate. This can be used to quickly view a longer time to see if a vehicle is overstaying or a gate is not secured.

GUI 200 also includes cameras window 208, which displays a thumbnail view of each camera selectable for the digital video alarm guard tour. As shown in FIG. 3, all active cameras at a client site are displayed within camera window 208. Each thumbnail view includes a name of the camera and a checkbox. If the checkbox is toggled on, then the camera is selected as part of the digital video alarm guard tour. As shown in FIG. 3, the front drive camera, the semi dock camera, and the loading dock exterior door 2 camera are part of the digital video alarm guard tour. Search input field 210 is configured to receive input used to search each camera name for search hits. For instance, if "loading" is entered as the search term, then only loading dock exterior door 2 camera, loading dock door camera and loading dock door camera are displayed in the thumbnail views. Search input field 210 is configured to narrow the number of cameras displayed through camera window 208. Save input button 212 may be selected to save the guard tour parameters selected by the user. Cancel button 214 may be selected to cancel the guard tour parameters selected by the user.

As shown in FIG. 3, the guard tour parameters may include a timeframe, a snapshot frequency, a time slice, day(s) of the week, and one or more selected cameras. One or more of these guard tour parameters may be transmitted to gatekeeper server 20. As shown in step 104 of flowchart 100, digital video clips and/or frames may be identified in response to the one or more guard tour parameters. Gatekeeper server 20 may be configured to make these identifications. The digital video clip and/or frames may be received from client network 12 along with information identifying the digital video clip and/or frames. The identifying information may be compared with the values of the one or more guard tour parameters to identify the digital video clips and/or frames. The digital video clips may be identified as those digital video clips within each time slice within a timeframe. The digital video frames may be identified as those digital video frames meeting each snapshot frame based on the time slice and the snapshot frequency. For instance, the time slice may be 5 seconds and the snapshot frequency may be 1. Using this example, a digital video frame may be identified within each 5 second time slice. The identified digital video frames and/or digital video clips may be stored to database 25.

In one or more embodiments, the identified digital video frames may be transmitted to motion detection module 24. As set forth in step 106 of FIG. 2, the process performs object detection on the identified digital video frames. The digital video frames may be a set of sequential snapshot frames. For instance, 10 snapshot frames sequenced in time can be collected and transmitted to motion detection module 24. Using this technique, digital video frames samples over a period can be used to detect motion instead of using all sequential video frames within a digital video clip. This has the benefit of processing less data over a longer period. Alternatively, the digital frames within an identified digital video clip may be submitted for motion detection. Motion detection module 24 is configured to detect motion within the sequence of digital video frame samples.

As depicted in step 108 of FIG. 2, the process performs object detection in response to motion detected in the sequence of digital video frame samples. One or more of the sequential snapshot frames in which motion was detected may be transmitted to object detection module 24. Object detection module 24 is configured to detect objects within the one or more sequential snapshot frames. Non-limiting examples of objects for object detection relate to those objects that are relevant to a virtual guard tour. Non-limiting examples include humans, vehicles, bags, camouflage, ski masks, etc. Object detection module 24 may be configured to transmit an object detected signal to gatekeeper server 20 signifying that an object was detected and including an indication of the type of object. If the type of object is a type monitored for alarm events, then computer system 10 creates a guard tour event. For example, the user can set an analytics tag for one or more types of objects. The user may want to trigger a guard tour event if a bag is detected during the virtual guard tour.

As depicted in step 110 of FIG. 2, the alarm event and associated digital video is transmitted. The associated digital video may be the one or more digital video frame associated with the object detected and the digital video frames and/or video clips associated with the motion detected. The alarm event and associated digital video may be transmitted to alarm monitoring module 26.

Figure 4:
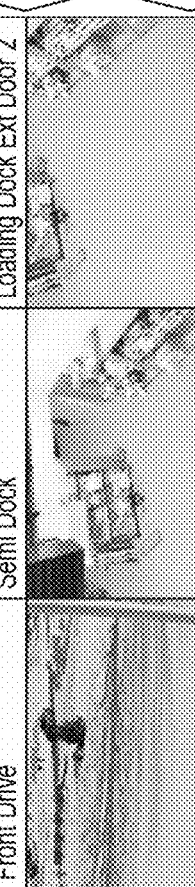
FIG. 4 is a GUI for displaying digital video alarm guard tours according to one embodiment.

Computer system 10 may also be configured to display snapshot frames from each network camera activated within a digital video alarm virtual tour. FIG. 4 is GUI 300 for displaying snapshot frames of a video alarm guard tour according to one embodiment. The snapshot frames are displayed within guard tour window 302 for each guard tour. Guard tours can be displayed based on subscriber. A subscriber can be selected by entering information into the text fields of subscriber window 304. Each digital video alarm guard tour is selectable. When the digital video alarm guard tour is selected, initiate tour button 306 is selectable to initiate a digital video alarm guard tour.

Figure 5:
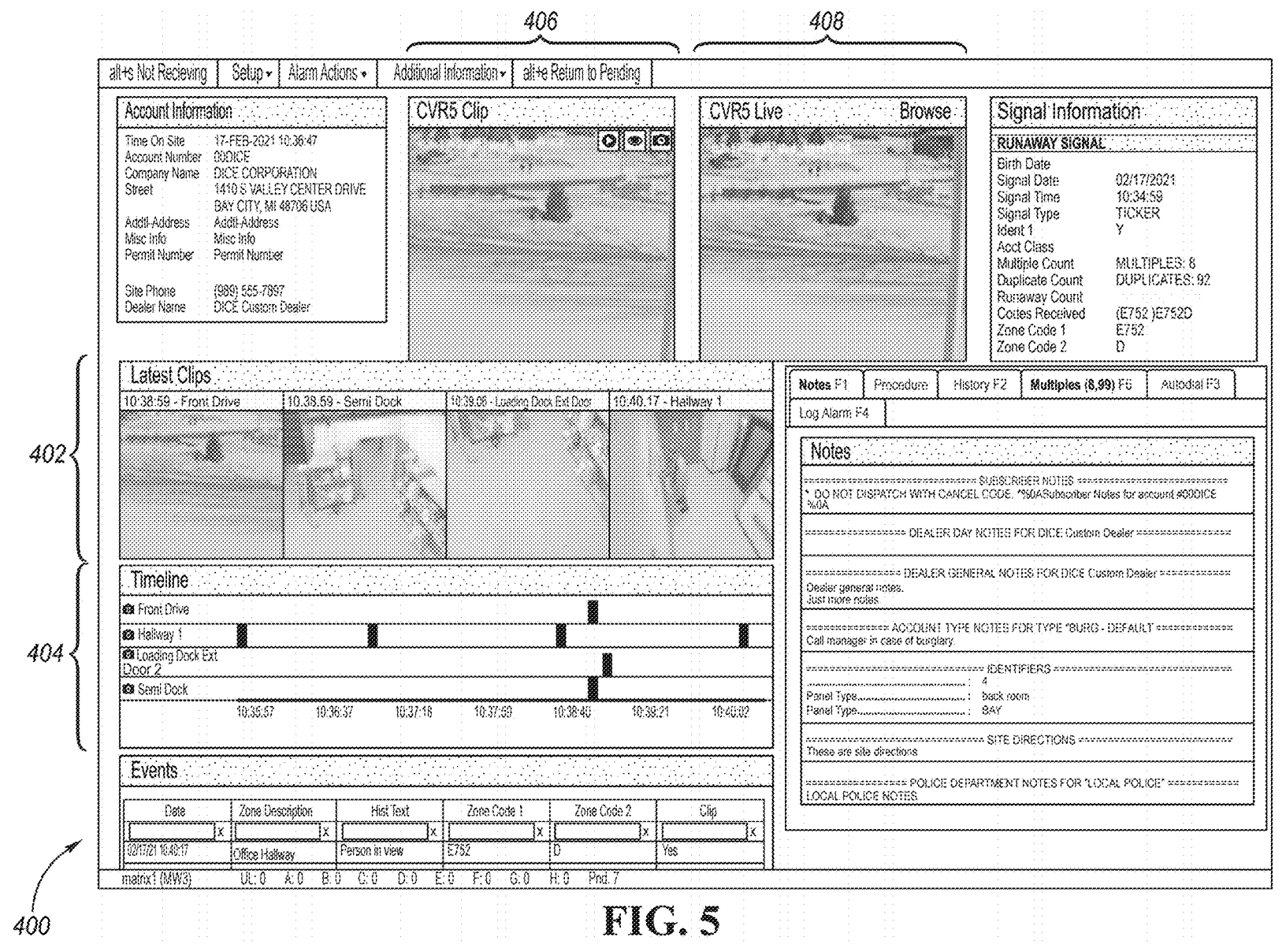

FIG. 5 is GUI 400 of a dashboard of a digital video alarm guard tour according to one embodiment. GUI 400 includes latest clips window 402, timeline window 404, recorded clip window 406 and live clip window 408. Latest clips window 402 may be configured to display a digital video frame within the latest digital video clip received by alarm monitoring module 26. By selecting a thumbnail within latest clips window 402, the digital video clip associated with the thumbnail is displayed within recorded clip window 406. Timeline window 404 displays a timeline of events on each camera activated for monitoring or in a guard tour. Live clip window 408 is configured to display a live feed of the selected thumbnail in live clip window 408. Timeline window 404 is configured to display the results of a digital video alarm virtual tour. The results may include alarm events and guard tour events. Each event is selectable to view the digital video clip triggering the event.

As part of a digital video alarm tour, digital video analytics server 14 may be configured to automatically obtain the digital video clips and/or frames associated with the digital video alarm tour. This data can be automatically populated into timeline window 404 and latest clips window 402. The GUI 400 may also display the digital video data associated with each alarm event and guard tour event. This mode may be referred to as an unattended guard tour. In another mode, which may be referred to as an assisted guard tour, a user reviews the digital video data to determine alarm events and guard tour events through GUI 400. In one embodiment of the assisted guard tour mode, system 10 does not perform object detection and/or motion detection, but alarm monitoring module 26 is configured to display digital video clips and/or digital video frames on a schedule formulated based on one or more guard tour parameters.

A computer system for digital video alarm guard tour monitoring is disclosed. The computer system includes a computer having non-transitory memory for storing machine instructions that are to be executed by the computer. The machine instructions when executed by the computer implement the following functions: receive one or more guard tour parameters; identify a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

A computer readable medium having non-transitory memory for storing machine instructions that are to be executed by the computer is disclosed. The machine instructions when executed by the computer implements the following functions: receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

A method for digital video alarm guard tour monitoring is disclosed. The method includes receiving one or more guard tour parameters; identifying a plurality of digital frames in response to the one or more guard tour parameters; motion analyzing the plurality of digital frames to detect motion between the plurality of digital frames; object analyzing the plurality of digital frames to detect an object and an object class of the object in response to detecting the motion; and transmitting a guard tour event and the plurality of digital frames to an alarm server in response to determining the object class is associated with an alarm analytics tag.

The following applications are related to the present application: U.S. patent application Ser. No. 17/232,284, filed on Apr. 16, 2021, U.S. patent application Ser. No. 17/232,247, filed on Apr. 16, 2021, U.S. patent application Ser. No. 17/232,261, filed on Apr. 16, 2021, U.S. patent application Ser. No. 17/232,266, filed on Apr. 16, 2021, U.S. patent application Ser. No. 17/232,275, filed on Apr. 16, 2021, and U.S. patent application Ser. No. 17/232,296, filed on Apr. 16, 2021, which are each incorporated by reference in their entirety herein.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A digital video alarm guard tour monitoring computer system including a computer having non-transitory memory for storing machine instructions that are to be executed by the computer, the machine instructions when executed by the computer implement the following functions:
   receiving one or more guard tour parameters;
   identifying a plurality of digital frames in response to the one or more guard tour parameters;
   motion analyzing the plurality of digital frames to detect motion between the plurality of digital frames;
   object analyzing the plurality of digital frames to detect an object and an object class of the object in response to detecting the motion; and
   transmitting one or more guard tour events and associated digital video to an alarm server in response to determining the object class is associated with an alarm analytics tag, the associated digital video includes one or more digital video frames of the plurality of digital video frames associated with the object detected and the motion detected.

2. The digital video alarm guard tour monitoring computer system of claim 1, wherein the one or more guard tour parameters include a start time and an end time of a digital video alarm guard tour.

3. The digital video alarm guard tour monitoring computer system of claim 1, wherein the one or more guard tour parameters include a number of digital video frames captured over the course of a selected time slice.

4. The digital video alarm guard tour monitoring computer system of claim 1, wherein the machine instructions when executed by the computer further implement the following functions:
   receiving digital video and information identifying the digital video; and
   comparing the information identifying the digital video with the one or more guard tour parameters to identify digital video clips and/or frames from the digital video.

5. The digital video alarm guard tour monitoring computer system of claim 1, wherein the machine instructions when executed by the computer further implement the following function of displaying the associated digital video.

6. The digital video alarm guard tour monitoring computer system of claim 1, wherein the machine instructions when executed by the computer further implement the following function of displaying a timeline of the one or more guard tour events.

7. A computer readable medium having non-transitory memory for storing machine instructions that are to be executed by the computer, the machine instructions when executed by the computer implements the following functions:
   receiving one or more guard tour parameters;
   identifying a plurality of digital frames in response to the one or more guard tour parameters;
   motion analyzing the plurality of digital frames to detect motion between the plurality of digital frames;
   object analyzing the plurality of digital frames to detect an object and an object class of the object in response to detecting the motion; and transmitting one or more guard tour events and associated digital video to an alarm server in response to determining the object class is associated with an alarm analytics tag, the associated digital video includes one or more digital video frames of the plurality of digital video frames associated with the object detected and the motion detected.

8. The computer readable medium of claim 6, wherein the one or more guard tour parameters include a start time and an end time of a digital video alarm guard tour.

9. The computer readable medium of claim 6, wherein the one or more guard tour parameters include a number of digital video frames captured over the course of a selected time slice.

10. The computer readable medium of claim 6, wherein the selected time slice is 1 to 10 seconds.

11. The computer readable medium of claim 6, wherein the machine instructions when executed by the computer further implement the following functions:
receiving digital video and information identifying the digital video; and
comparing the information identifying the digital video with the one or more guard tour parameters to identify digital video clips and/or frames from the digital video.

12. The computer readable medium of claim 6, wherein the machine instructions when executed by the computer further implement the following function of displaying the associated digital video.

13. The computer readable medium of claim 6, wherein the machine instructions when executed by the computer further implement the following function of displaying a timeline of the one or more guard tour events.

14. A method for digital video alarm tour monitoring, the method comprising:
receiving one or more guard tour parameters;
identify a plurality of digital frames in response to the one or more guard tour parameters;
motion analyzing the plurality of digital frames to detect motion between the plurality of digital frames;
object analyzing the plurality of digital frames to detect an object and an object class of the object in response to detecting the motion; and
transmitting one or more guard tour events and associated digital video to an alarm server in response to determining the object class is associated with an alarm analytics tag, the associated digital video includes one or more digital video frames of the plurality of digital video frames associated with the object detected and the motion detected.

15. The method of claim 14, wherein the one or more guard tour parameters include a start time and an end time of a digital video alarm guard tour.

16. The method of claim 14, wherein the one or more guard tour parameters include a number of digital video frames captured over the course of a selected time slice.

17. The method of claim 14, wherein the selected time slice is 1 to 10 seconds.

18. The method of claim 14, further comprising receiving digital video and information identifying the digital video; and comparing the information identifying the digital video with the one or more guard tour parameters to identify digital video clips and/or frames from the digital video.

19. The method of claim 14, further comprising displaying the associated digital video.

20. The digital video alarm guard tour monitoring computer system of claim 6, wherein the one or more guard tour events are selectable to view the associated digital video triggering the one or more guard tour events.

* * * * *